(12) United States Patent
Talman (10) Patent No.: US 12,334,228 B2
(45) Date of Patent: Jun. 17, 2025

(54) ION COLLIDER FOR NUCLEAR FUSION

(71) Applicant: Cornell University, Ithaca, NY (US)

(72) Inventor: Richard M. Talman, Ithaca, NY (US)

(73) Assignee: Cornell University

( * ) Notice: Subject to any disclaimer, the term of this patent is extended or adjusted under 35 U.S.C. 154(b) by 0 days.

(21) Appl. No.: 18/763,158

(22) Filed: Jul. 3, 2024

(65) Prior Publication Data

US 2025/0014767 A1 Jan. 9, 2025

Related U.S. Application Data

(60) Provisional application No. 63/525,096, filed on Jul. 5, 2023.

(51) Int. Cl.
   *G21B 3/00* (2006.01)
(52) U.S. Cl.
   CPC ......... *G21B 3/006* (2013.01); *H05H 2277/13* (2013.01)
(58) Field of Classification Search
   CPC .......... G21B 3/006; H05H 13/04; H05H 7/06; H05H 2007/065; H05H 2277/13
   See application file for complete search history.

(56) References Cited

U.S. PATENT DOCUMENTS

| 4,246,067 A | * | 1/1981 | Linlor | G21B 3/006 376/127 |
| 5,854,531 A | * | 12/1998 | Young | H05H 7/06 376/199 |
| 2011/0026658 A1 | * | 2/2011 | Howard | H05H 1/02 376/133 |

OTHER PUBLICATIONS

Hoffstaetter, Georg H., Sol M. Gruner, and Maury Tigner. "Cornell Energy Recovery Linac science case and project definition design report." Cornell University (2013). (Year: 2013).*
Mcnally, J. Rand. "D-3He as a "clean" fusion reactor." Nuclear fusion 18.1 (1978): 133. (Year: 1978).*

(Continued)

*Primary Examiner* — Sharon M Davis
(74) *Attorney, Agent, or Firm* — Cozen O'Connor (57) ABSTRACT

An ion collision A fusion power generation method includes co-circulating a first and a second charged-particle beam on a same orbit of a synchrotron. The method also includes, at completion of every $M^{th}$ turn of the first charged-particle beam in the synchrotron, traversing the first charged-particle beam with the second charged-particle beam during an $N^{th}$ turn of the second charged-particle beam. The method may include applying a radial electric field and a transverse magnetic field to each of the first the second charged-particle beam, such that each of quantities $q_1 r_0 e(E_0/v_1+B_0)/p_1$ and $q_2 r_0 e(E_0/v_2+B_0)/p_2$ equals one, where (i) $q_1$, $v_1$, and $p_1$ are the charge, velocity, and momentum of each charged particle of the first charged-particle beam, respectively, (ii) $q_2$, $v_2$, and $p_2$ are the charge, velocity, and momentum of each charged particle of the second changed-particle beam, respectively, and (iii) $E_0$ and $B_0$ are magnitudes of the applied electric field and magnetic field.

11 Claims, 8 Drawing Sheets

(56) References Cited

OTHER PUBLICATIONS

Talman, R.M. "Improving the hadron EDM upper limit using doubly-magic proton and helion beams" arXiv:2205.10526v1 [physics.acc-ph], May 21, 2022, 46 pages.
Abusaif, F. et al. "Storage ring to search for electric dipole moments of charged particles" Feasibility study, CPEDM Collaboration, vol. 3 (2021), 257 pages.
Talman, R.M. "Superimposed Electric/Magnetic "Dipole Moment Comparator" Lattice Design" arXiv:2108.12353v1 [physics.acc-ph] Aug. 24, 2021, 21 pages.

* cited by examiner

210
Co-circulate a first charged-particle beam and a second charged-particle beam on a same orbit of a synchrotron.

212
Apply a radial electric field and a transverse magnetic field to each of the first charged-particle beam and the second charged-particle beam, such that each of quantities $q_1 r_0 e(E_0/v_1 + cB_0)/p_1 c$ and $q_2 r_0 e(E_0/v_2 + cB_0)/p_2 c$ equals one.

220
At completion of every $M^{th}$ turn of the first charged-particle beam in the synchrotron, traverse the first charged-particle beam with the second charged-particle beam during an $N^{th}$ turn of the second charged-particle beam, where $N$ and $M$ are positive integers and $N$ exceeds $M$.

230
Redirecting, a plurality of alpha particles, resulting from step 220, into an energy-recovery linear accelerator.

240
Capture electrical energy from the plurality of alpha particles.

| | $\beta_1$ | $Q_{s1}$ | KE1 MeV | E0 MV/m | $\eta_{M1}$ | $\beta_2$ | $Q_{s2}$ | KE2 MeV | $\beta^*$ | $\gamma^*$ | $M_*$ GeV | Q12 KeV | $\gamma\beta_1/\beta_2$ | $bm$ 2 |
|---|---|---|---|---|---|---|---|---|---|---|---|---|---|---|
| $bm$ 1 | | | | | | | | | | | | | | |
| h | 0.1826 | -0.666 | 48.000 | 4.96139 | -0.14662 | 0.1597 | -1.097 | 24.391 | 0.17343 | 1.01539 | 4.68432 | 311.21468 | 8.00083 | d |
| h | 0.1844 | -0.666 | 49.000 | 5.06742 | -0.14742 | 0.1613 | -1.098 | 24.901 | 0.17519 | 1.01571 | 4.68432 | 317.54603 | 8.00015 | d |
| h | 0.1862 | -0.666 | 50.000 | 5.17355 | -0.14822 | 0.1630 | -1.098 | 25.410 | 0.17693 | 1.01603 | 4.68433 | 323.87133 | 7.99947 | d |

Transnuclear Rainbows

ION COLLIDER FOR NUCLEAR FUSION

CROSS-REFERENCE TO RELATED APPLICATION

This application claims the benefit of U.S. Provisional Application No. 63/525,096, filed 5 Jul. 2023, the disclosure of which is incorporated herein by reference in its entirety.

SUMMARY OF THE EMBODIMENTS

In a first aspect, a fusion-power generation method is disclosed. The method includes co-circulating a first charged-particle beam and a second charged-particle beam on a same orbit of a synchrotron. The method also includes at completion of every $M^{th}$ turn of the first charged-particle beam in the synchrotron, traversing the first charged-particle beam with the second charged-particle beam during an $N^{th}$ turn of the second charged-particle beam, where N and M are positive integers and N exceeds M.

In a second aspect, fusion-power generator is disclosed. The fusion-power generator includes a synchrotron, a first injection accelerator, and a second injection accelerator. The synchrotron includes a plurality of beam-deflection units, each of the plurality of beam-deflection units including a magnetic deflection unit and an electro-static deflection unit that produce, respectively, a magnetic field and an electric field across a storage ring of the synchrotron. The first injection accelerator is coupled to the synchrotron and injects a plurality of first ions into the synchrotron. The second injection accelerator is coupled to the synchrotron and injects a plurality of second ions into the synchrotron.

DETAILED DESCRIPTION OF THE EMBODIMENTS

Overview

A predominantly electric E&M storage ring, with weak superimposed magnetic bending, is shown to be capable of storing two different particle type bunches, such as helion (h) and deuteron (d), or electron ($e^-$), co-traveling with different velocities on the same central orbit. Rear-end collisions occurring periodically in a full acceptance particle detector/polarimeter, allow the (previously inaccessible) direct measurement of the spin dependence of nuclear transmutation for center of mass (CM) kinetic energies (KE) ranging from hundreds of keV up toward pion production thresholds. With the nuclear process occurring in a semi-relativistic moving frame, all initial and final state particles have convenient laboratory frame KEs in the tens to hundreds of MeV. The rear-end collisions occur as faster stored bunches pass through slower bunches.

An inexpensive facility capable of meeting these requirements is disclosed, with several nuclear channels as examples. Especially noteworthy are the $e^{+/-}$-induced weak interaction triton (t) β-decay processes, $t+e^+ \rightarrow h+v$ and $h+e^- \rightarrow t+v$. Experimental capability of measurement of the spin dependence of the induced triton case is emphasized. For cosmological nuclear physics, the experimental improvement will be produced by the storage ring's capability to investigate the spin dependence of nuclear transmutation processes at reduced kinetic energies compared to what can be obtained with fixed target geometry.

INTRODUCTION

The proton is the only stable elementary particle for which no experimentally testable fundamental theory predictions exist. Direct p, p and p, n coupling is too strong for their interactions to be calculable using relativistic quantum field theory. Next-best: the meson-nucleon perturbation parameter (roughly 1/5) is small enough for standard model theory, with its quarks and gluons, to be based, numerically, predominantly on π meson, nucleon scattering. This finesses complications associated with finite size, internal structure, and compound nucleus formation.

These issues should be addressed experimentally, but this is seriously impeded by the absence of nuclear physics measurement, especially concerning spin dependence, for particle kinetic energies (KE) in the range from 300 keV to several MeV, comparable with Coulomb potential barrier heights. Even though multi-keV scale energies are easily produced in vacuum, until now spin measurement in this region has been prevented by space charge and negligibly short particle ranges in matter. In this energy range, negligible compared to all nucleon rest masses, the lab frame and the CM frame coincide.

To study spin dependence in nuclear scattering, one must cause the scattering to occur in what is (at least a weakly relativistic) moving frame of reference. This is possible using "rear-end" collisions in a predominantly electric E&M storage ring. Superimposed weak magnetic bending makes it possible for two beams of different velocity to circulate in the same direction, at the same time, in the same storage ring. "Rear-end" collisions occurring during the passage of faster bunches through slower bunches can be used to study spin dependence on nucleon-nucleon collisions in a moving coordinate frame.

Such "rear-end" collisions allow the CM KEs to be in the several 300 keV range, while all incident and scattered particles have convenient laboratory KEs, two orders of magnitude higher, in the tens of MeV range. Multi-MeV scale incident beams can then be established in pure spin states and the momenta and polarizations of all final state particles can be measured with high analyzing power and high efficiency. In this way, embodiments of storage rings disclosed herein satisfy the condition that all nuclear collisions take place in a coordinate frame moving at convenient semi-relativistic speed in the laboratory, with CM KEs comparable with Coulomb barrier heights.

Importance of Anomalous Nuclear MDM G-Values

One motivation for the E&M storage ring disclosed herein centers on the careful study of elastic or weakly inelastic nucleon scattering, and emphasizes the possible role played by the anomalous magnetic dipole moment (MDM), G. A feature of the rings being disclosed here follows from their superimposed electric and magnetic bending, which provides the capability of simultaneously co- or counter-circulating frozen or pseudo-frozen spin beams of different particle type.

The original motivation for the development of E&M rings was to investigate time reversal violation in the form of non-vanishing proton electric dipole moment (EDM), which has always been assumed to constrain the strong nuclear force. But, in actuality, the electromagnetic and nuclear forces are inextricably connected in actual protons. The influence of this marriage has been well accounted for, in both classical and quantum mechanics, for low energy Rutherford scattering differential scattering cross sections. However, in p,p scattering, there is also proton spin precession caused by the (relativistically-implied) B=v×E magnetic field (in the proton's rest frame) acting on the proton's anomalous magnetic moment.

In the present context, when ultrahigh frequency domain MDM precision is required, it is appropriate to have runs long enough for spin orientations to complete an integral number of rotations after an integral number of turns. For this purpose it is appropriate to express the anomalous MDM as a rational fraction, in order to determine the minimum number of turns required, and the exact number of turns required to produce an integral number of spin revolutions. This capability is abbreviated to the phrase with frequency domain precision.

The E&M storage ring configuration is ideal for the precision measurement of anomalous nuclear MDM G-values. Such rings serve naturally for the function of "mutual co-magnetometry" for precision experimental determination of G-values of nuclear particles.

In the present context there is an equally important need for knowing the MDMs of nuclear isotopes to the highest possible precision. What needs to be explained is the way that storage ring steering can be set and reset to frequency domain precision (i.e. with precision that would be unachievable by direct field strength control) using the particle anomalous magnetic moments as "magnetometric gyroscopes".

For historical reasons, based probably on the great importance and successful application of the g-factor in atomic physics, the anomalous MDM parameter G, a fundamental measurable ratio of nucleus angular momentum (proportional to inertial mass m of nucleon) to magnetic moment (proportional to charge of the same nucleus) is less systematically updated and made available than is g. With Z and A being dimensionless measures, the ratio of integers, A/Z, justifies regarding g(A/Z) as being a function of A and Z only via the ratio A/Z. To be "anomalous" the dimensionality of G and g must be the same: i.e. their ratio is dimensionless. For every nucleon, Z is truly an integer multiple of (positive) proton charge e. Regrettably, for example because of nuclear binding energy, nucleon mass ratios are only approximately given by the mass number A.

Superimposed E/B Storage Ring Bending

This section concerns the simultaneous storage of two different particle type beams in the circular arcs of a predominantly electric "E&M" storage ring with superimposed magnetic bending.

For simplicity, the arcs are assumed to be perfect circles, of bending radius $r_0$, joined tangentially by bend-free straight sections of arbitrary length. Without essential loss of generality, we assume the geometry has super-periodicity four, giving it the shape of a rounded square, or a squared-off circle.

Fractional bending coefficients $\eta_E$ and $\eta_m$ are defined by $$\eta_E = \frac{qr_0}{pc/e}\frac{E_0}{\beta}, \eta_M = \frac{qr_0}{pc/e}cB_0, \qquad (1)$$

neither of which is necessarily positive. The ratio $\eta_E/\eta_M$ equals $(E_0/\beta)/cB_0$. In equation 1, c is speed of light, e is the elementary charge, q is the charge of the circulating particle, $\beta$ is the magnitude of particle's velocity v divided by the speed of light c, p is the particle's momentum, $E_0$ is the magnitude of an externally-applied radial electric field in a radial direction, and $B_0$ is the magnitude of the externally-applied magnetic field in a vertical direction perpendicular to the radial direction from the storage ring's center. The vertical direction is parallel to the axes of the aforementioned circular arcs. When charge q is positive, as for nuclei, the externally-applied electric field may point toward the center of the storage ring.

The discussion in this section amounts to the introduction of "electric rigidity" to go along with, more familiar, magnetic rigidity. These quantities are proportional to the inverses of the coefficients in Eq. 1. For brevity, and to avoid unit-dependent confusion, the term "rigidities" will be used without formal definition.

By symmetry, stable all-electric storage ring orbits are forward/backward symmetric and there are continua of different orbit velocities and radii, one of which matches the design ring radius $r_0$ in each direction. To represent the required bending force at radius $r_0$ being augmented by magnetic bending while preserving the orbit curvature, the bending coefficients may satisfy equation (2) for each type of particle circulating in the storage ring.

$$\eta_E + \eta_M = 1 \qquad (2)$$

In embodiments, $|\eta_M| < |\eta_E|$. Equation (2) may be expressed as equation (3).

$$\frac{qr_0e}{p}\left(\frac{E_0}{v} + B_0\right) = 1 \qquad (3)$$

The resulting magnetic force dependence on direction causes an $\eta_M > 0$ (call this "constructive") or $\eta_M < 0$ ("destructive") perturbation to shift opposite direction orbit velocities (v) of the same radius, one up in radius and one down, resulting in two stable orbits in each direction. For stored beams, any further $\Delta\eta_M \neq 0$ change causes beam velocities to ramp up in kinetic energy (KE=$\epsilon$−mc$^2$) in one direction, down in the other.

Embodiments of the E&M storage ring disclosed here are ideal for investigating low-energy nuclear processes and, especially, their spin dependence at low energy. Consider the possible existence of a stable orbit particle pair (necessarily of different particle type) such as deuteron/proton (d, p) or deuteron/helion (d, h), each with laboratory kinetic energy (KE) in the tens of MeV range, and traveling simultaneously with different velocities in the same direction. This periodically enables "rear-end" collision events whose CM KEs can be tuned into the several 300 keV range by changing 77M. This description is not effective for "same particle" pairs, such as p, p or d, d. Their resultant co-traveling bunch velocities remain identical and no "rear-end" collisions ensue.

Depending on the sign of magnetic field B, either the lighter or the heavier particle bunches can be faster, "lapping" the slower bunches periodically, and enabling "rear-end" nuclear collision events. (The only longitudinal complication introduced by dual beam operation is that the "second" beam needs to be injected with accurate velocity, directly into stable RF buckets.)

Only in such a storage ring can "rear-end" collisions occur with heavier particle bunches passing through lighter particle bunches, or vice versa. From a relativistic perspective, treated as point particles, the two configurations just mentioned would be indistinguishable. As observed in the laboratory, to the extent the particles are composite, such collisions would classically be expected to be quite different and easily distinguishable.

Proposed E&M Ring Properties

In embodiments, the electrical and magnetic bending fractions $\eta_E$ and $\eta_M$ to satisfy equation (2) and $|\eta_M/\eta_E|<0.1$. The restriction to predominantly electric bending is arbitrary, not fundamental, and is adopted primarily to simplify discussion in the present paper, especially when bending fraction $\eta_M$ is small enough to be described as "perturbative". This perturbation "splits" a unique velocity closed circular orbit solution into two slightly separated velocity circular solutions. As a result there are periodic "rear-end" collisions between two particles co-moving with substantially different velocities in the laboratory. Their CM KEs can be in the several 300 KeV range. All incident and scattered particles then have convenient laboratory KEs, two orders of magnitude higher, in the tens of MeV range.

Our proposed "E&M" storage ring is ideal for investigating low energy nuclear processes. With careful tuning of E and B, certain nucleon bunch pairs of different particle type, such as p and d or d and h, can have appropriately different charge, mass, and velocity for their rigidities to be identical. Both beams can then co-circulate indefinitely, with different velocities. For nuclear beams of different particle type, depending on the sign of magnetic field B, either lighter or heavier particle bunches will be faster, "lapping" the slower bunches periodically, and enabling "rear-end" nuclear fusion events.

Storage Ring PTR with E&M Bending

It is possible, with superimposed electric and magnetic bending, for beam pairs of different particle type to co-circulate simultaneously. This opens the possibility of "rear-end" collisions occurring while a fast bunch of one nuclear isotope type passes through a bunch of lighter, yet slower, isotope type (or vice versa). The Pavsic formalism seems well suited to the empirical experimental representation of measured differences between these two possibilities.

Figure 1:
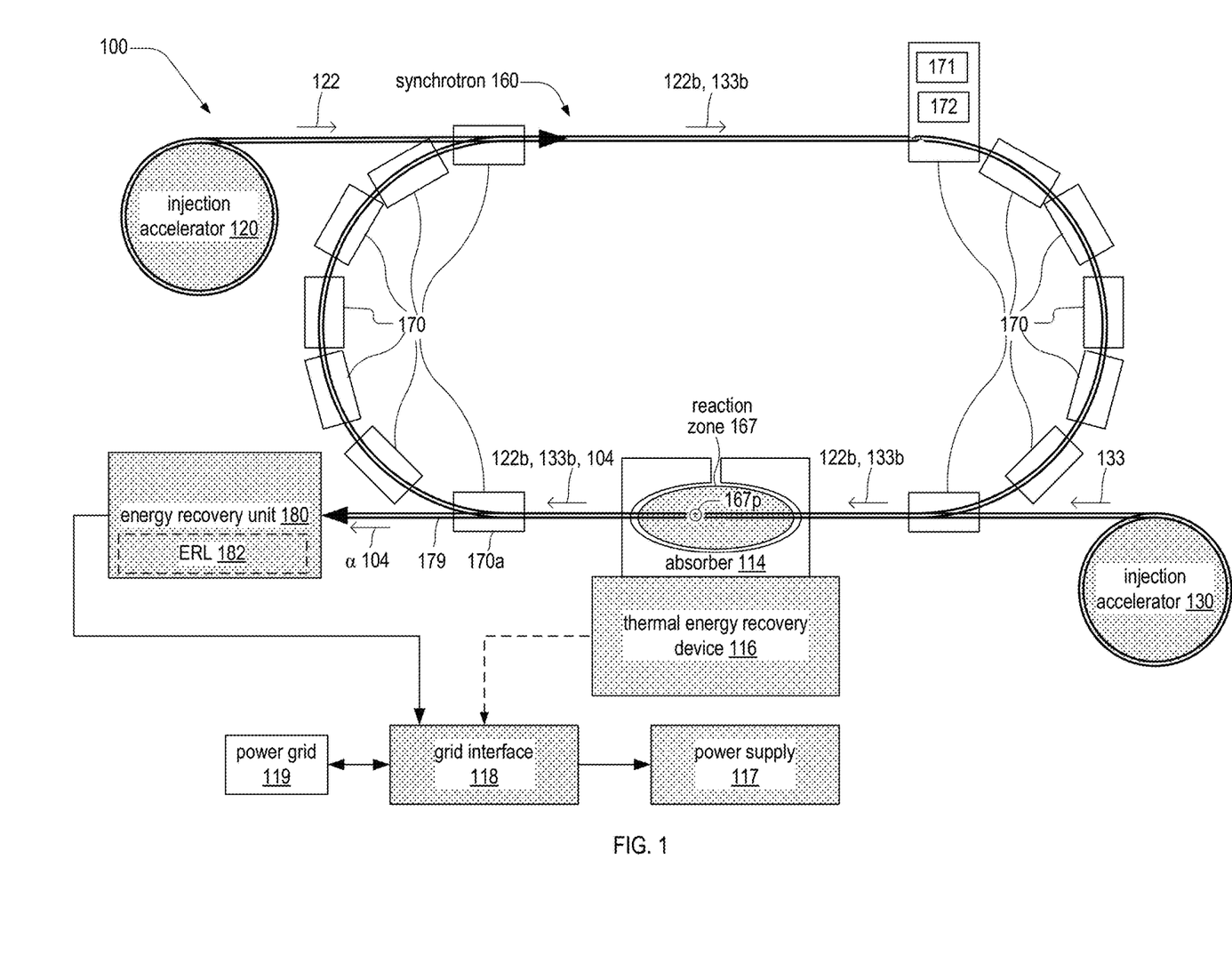
FIG. 1 is a schematic of a fusion-power generator, in an embodiment.

FIG. 1 is a schematic of a fusion-power generator 100. Fusion-power generator 100 may generate power from interactions between a low-Z nuclei of respective charged-particle beams. For example, the interactions may be between $^3$He nuclei and deuterium reactions. Herein, a $^3$He nucleus is also denoted as helium-3, a $^3$He nucleus, $^3$He$^{2+}$, helion, and h; and a deuterium nucleus is also denoted by H$^{1+}$, deuteron, and d.

Fusion-power generator 100 includes a synchrotron 160, an injection particle accelerator 120, an injection particle accelerator 130, a reaction zone 167, a radiation absorber 114, an energy recovery unit 180, a thermal energy recovery device 116, a grid interface 118, and a power supply 117. Power supply 117 may be an electrical power storage device. Either or both of injection particles accelerators 120 and 130, hereinafter accelerators 120 and 130, may be a cyclotron or a linear accelerator. Thermal energy recovery device 116 may be connected to grid interface 118 and may include one or more of a turbine and an electric generator.

Synchrotron 160 includes a plurality of beam deflection units 170. A beam deflection unit 170 may include one or more of an electro-static deflection unit 171 and a magnetic deflection unit 172. Synchrotron 160 may be a storage ring.

The following describes an example mode of operation of fusion-power generator 100. Injection accelerators 120 and 130 inject ions 122 and ions 133, respectively, into synchrotron 160. Ions 122 and 133 circulate in synchrotron 160 as a charged-particle beam 122b and a charged-particle beam 133b, respectively. Each of ions 122 may be a first type of low-Z nucleus, such as deuteron, while each of ions 133 may be a second type of low-Z nucleus, such as helion.

Ions 122 and 133 interact in a reaction zone 167 to produce alpha particles 104. Reaction zone 167 includes an intersection point 167p. FIG. 1 denotes a first deflection unit 170 as 170a, which is the first deflection unit 170 along the beam path after reaction zone 167. Deflection unit 170a separates alpha particles 104 from recirculating charged-particle beam 122b and charged-particle beam 133b based on their mass-to-charge ratio, and outputs alpha particles 104 to energy recovery unit 180. Energy recovery unit 180 may include one or more energy-recovery linear accelerators 182, herein also ERL 182. Fusion-power generator 100 may include a beamline 179 though which alpha particles 104 propagate to synchrotron 160.

In a particular embodiment, protons are also separated from the beam by mass separator 140 and fed to energy recovery unit 180. Thermal radiation, including gamma radiation, from reaction zone 167 is captured by radiation absorber 114, which absorbs one or both of thermal and gamma radiation. Radiation absorber 114 may be a radiation shielding blanket. Heat from radiation absorber 114 powers a thermal energy recovery system 116.

Unreacted ions 122 and 123 remain in synchrotron 160 and are deflected around synchrotron 160 by deflection units 170 disposed around synchrotron 160. In embodiments, beam focus is maintained with focusing systems (not shown). Energy from energy recovery unit 180 and thermal energy recovery system 116 is coupled onto a power grid 119 by a grid interface 118. Power from power grid 119 may be used to drive power supplies 117 for at least part of fusion-power generator 100, such as injection accelerators 120 and 130 and beam deflection units 170.

Figure 2:
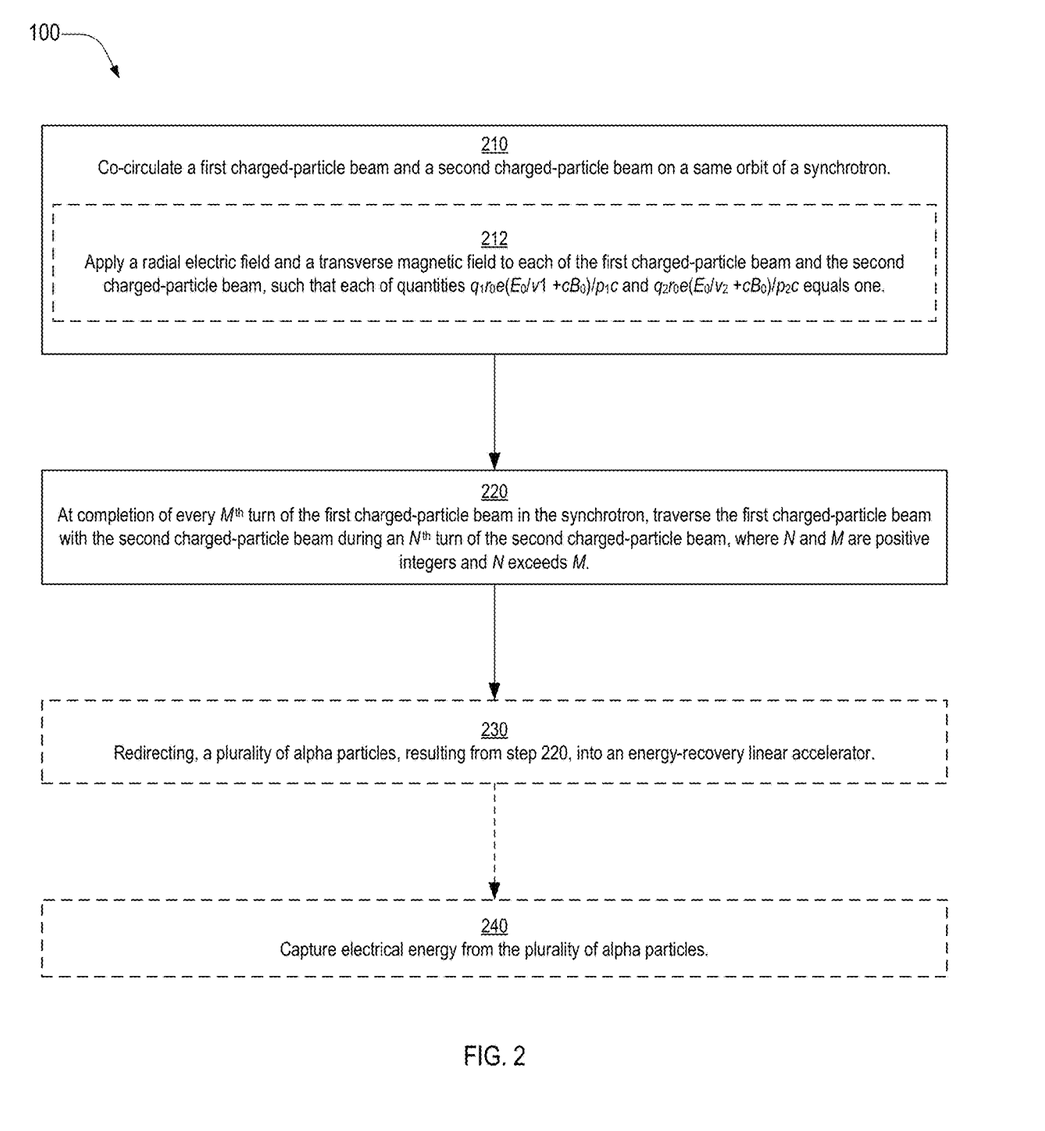
FIG. 2 is a flowchart illustrating an embodiment of a fusion-power generation method, which may be implemented by embodiments of the fusion-power generator of FIG. 1.

FIG. 2 is a flowchart illustrating a fusion-power generation method 200, which may be implemented with fusion-power generator 100. Fusion-power generation method 200 includes steps 210 and 220, and may also include at least one of steps 230 and 240.

The following description of method 200 includes parenthetical numbers following terms used in a method step. The parenthetical number indicates that the element associated with the number in parenthesis is an example of the term. For example, the description of step 210 below recites "a synchrotron (160)," which means that synchrotron 160 of fusion-power generator 100, FIG. 1, is an example of the synchrotron introduced in step 210.

Step 210 includes co-circulating a first charged-particle beam (122b) and a second charged-particle beam (133b) on a same orbit of a synchrotron (160). The first charged-particle beam may include a plurality of identical first low-Z nuclei. The second charged-particle beam may include a plurality of identical second low-Z nuclei that differ from the plurality of first low-Z nuclei. In embodiments, the first low-Z nucleus is deuteron and the second low-Z nucleus is helion. The first and the second charged-particle beams may propagate in a same direction in the synchrotron.

Step 210 may include a step 212, which includes applying a radial electric field and a transverse magnetic field to each of the first charged-particle beam and the second charged-particle beam, such that equation (3) is satisfied for each of the first charged-particle beam and the second charged-particle beam. The radial electric field points toward the center of a storage ring of the synchrotron when each of the first and the second charged particle beams include positively-charged particles.

Step 220 includes, at completion of every $M^{th}$ turn of the first charged-particle beam in the synchrotron, traversing the first charged-particle beam with the second charged-particle beam during an $N^{th}$ turn of the second charged-particle beam, where N and M are positive integers and N does not equal M. For example, N exceeds M. In embodiments, at least one of: M equals seven and N equals eight and a ratio of respective velocities of the second charged-particle beam to the first charged-particle beam equals to N/M.

Method 200 may include at least one of steps 230 and step 240 when the traversing of step 220 results in an exothermic reaction that produces a plurality of alpha particles (104). Said traversing may repeatedly result in the exothermic reaction at a same location (167) within a storage ring of the synchrotron (160). Step 230 includes redirecting the plurality of alpha particles (104) into an energy-recovery linear accelerator (182). Step 230 may precede step 240. Step 240 includes capturing electrical energy from the plurality of alpha particles, for example, by use of one or more of thermal energy recovery device 116, power supply 117, grid interface 118, and power grid 119 of FIG. 1.

Figure 3:
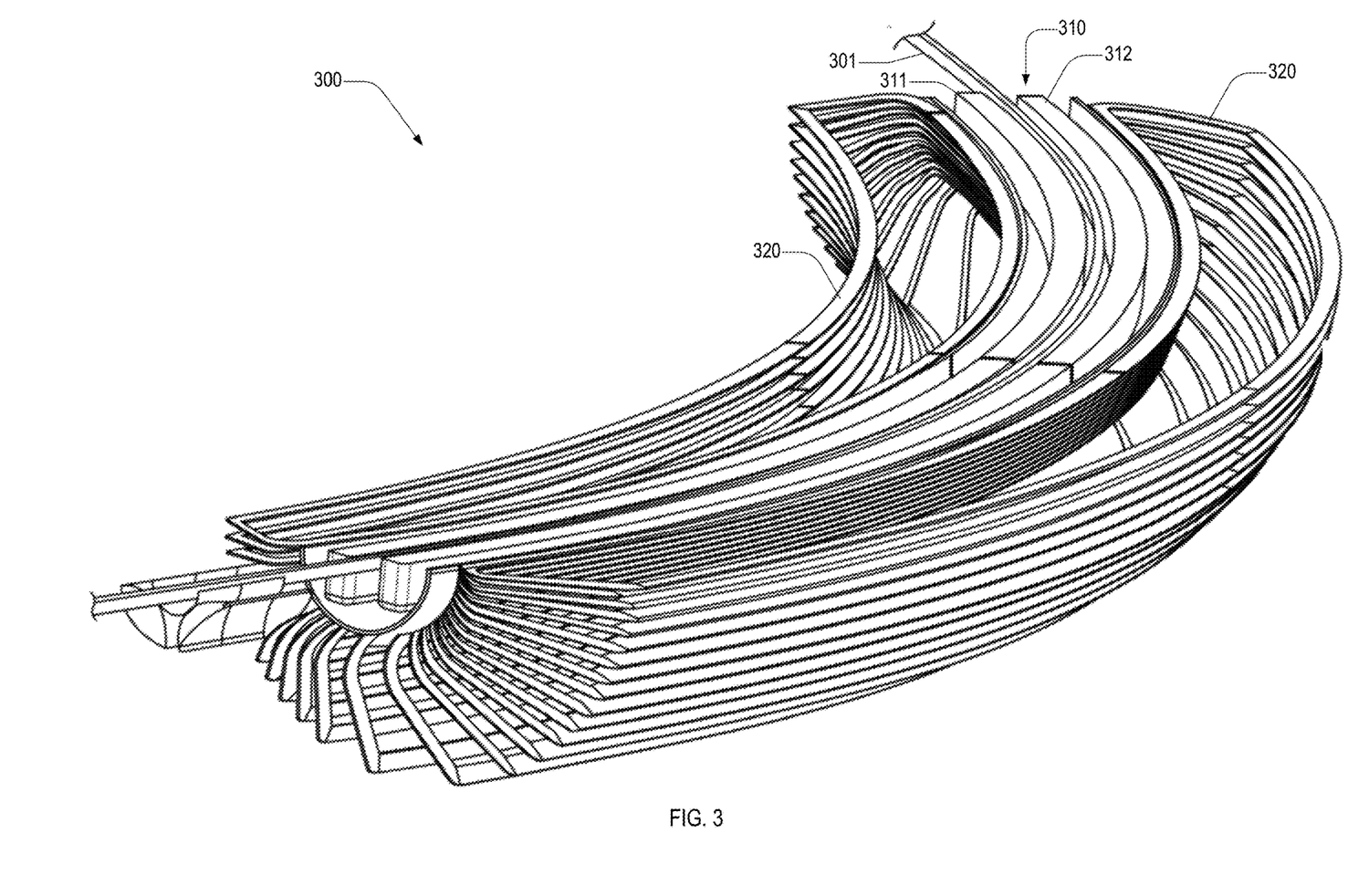
FIGS. 3 and 4 depict an embodiment of a ring bending element of the fusion-power generator of FIG. 1.
Figure 4:
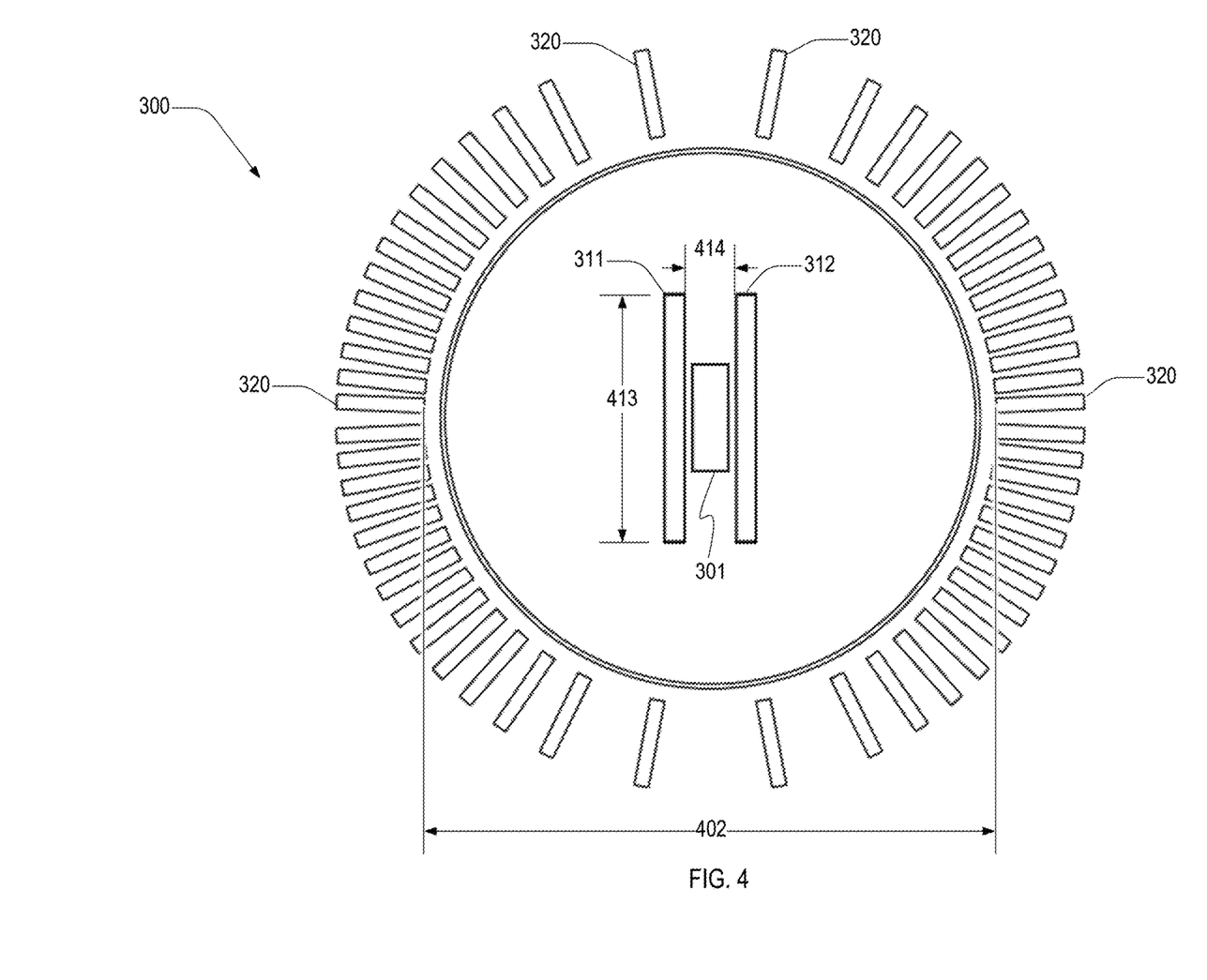

FIG. 3 is a cutaway drawing of one sector of a ring bending element 300, which includes an electrostatic deflector 310 and magnet coils 320. FIG. 4 is an end view of ring bending element 300. For clarity of illustration, FIG. 3 omits a top section of magnet coils 320, and only selected magnet coils 320 are designated with a reference number in each of FIGS. 3 and 4. Ring bending element 300 is an example of deflection unit 170 of fusion-power generator 100, FIG. 1. Electrostatic deflector 310 and magnet coils 320 are respective examples of electro-static deflection unit 171 and magnetic deflection unit 172. FIGS. 3 and 4 are best viewed together in the following description.

Each electrostatic deflector 310 includes of two cylindrical parallel metal plates 311 and 312. FIGS. 3 and 4 denotes a beam path 301, located between plates 311 and 312, along which charged-particle beams 122b and 133b travel. In operation, plates 311 and 312 may be held an equal electric potential and opposite sign. With the zero voltage contour of electric potential defined to be the center line of deflector 310, the ideal orbit of the design particle stays on the center line. The electrical potential vanishes on the center line of the bends, as well as in drift sections well outside the bends. Therefore, the electric potential vanishes everywhere on the ideal particle orbit. With the electric potential seen by the ideal particle continuous at the entrance and exit of the deflector, its total momentum is constant everywhere (even through the RF cavity). In embodiments, electrostatic deflector 310 produces an electric field with a magnitude $E_0$ between 8 MV/m and 12 MV/m. Magnet coils 320 may produce magnetic field with a magnitude $B_0$ between 24 mT and 36 mT.

Metal plates 311 and 312 have a height 413 and are separated by a distance 414, which may be between 20 mm and 320 mm. Height 413 may be between 80 mm and 310 mm. Metal plates 311 and 312 may be formed of aluminum, and may be coated with titanium nitride. A voltage difference between plates 311 and 312 may be 600 kV. In the plane of FIG. 4, magnet coils 320 define an aperture within bending element 300 that has a diameter 402, which may be between 450 mm and 550 mm.

The optimal thick lens PTR optics (i.e. with quadrupoles essentially turned off, and functioning only for trimming) is uniquely determined, with $m_{norm.}$ being close to 1/3, closer to m=0 (cylindrical) than to m=1 (spherical) electrode shape.

With obvious scaling changes, namely electric, $E_0/\beta$, and magnetic, $cB_0$, field strengths varying inversely with the factor $qr_0/p$, as given in Eq. (1). The same focal relationship is valid at all scales, from microscopic to cosmological. For example, by doubling $r_0$ to 22 m, the value of $E_0$ would be reduced from 5.06 MV/m to 2.53 MV/m. See, for example, the central row of a table 600 of FIG. 5.

Bend Field Stabilization and Resettability

When contemplating the high precision measurement of nuclear parameters, especially their anomalous magnetic moments G, one assumes that all intentional electric and magnetic field components are known with high precision and all unintentional field components are known to vanish with high accuracy. The degree to which this can be achieved in a "small" accelerator, say of 300 m circumference, needs to be established.

Though it is possible to measure both magnetic and electric field components to high accuracy in many locations, it is not possible to make such measurements exactly along the storage ring design central orbit. In this respect, polarized beams can come to the rescue.

As regards the orientation of the beam polarization, it is essential to distinguish between "in-plane" and "out-of-plane" orientations, where "the plane" refers to the ring beam plane, which is presumed to be horizontal. In-plane precession, induced by ideal magnetic fields acting on beam particle magnetic dipole moments (MDMs) is routinely the dominant spin precession.

Assuming the absence of non-zero electric dipole moments (EDMs) as is required by time reversal invariance, out-of-plane precession can be induced only by electric or magnet field imperfection—radial, in-plane magnetic field components or vertical out-of-plane electric field components. In practice, the inevitable existence of unintentional fields acting on particle MDMs will induce out-of-plane precession. The radial magnetic field average or the $\langle B_r \rangle$ and the vertical electric field $\langle E_y \rangle$ average are expected to be the dominant source of spurious MDM-induced precession.

The leading strategy for setting and resetting conditions will be to monitor the beam polarizations to feedback-stabilize the beam polarizations. Before this, however, this condition can be achieved by adjusting local beam deflection components; $\langle B_r \rangle$ can be canceled by canceling the out-of-plane (vertical) orbit separation of (sequential) counter-circulating beams. (Hysteresis in the possible soft iron cylinder mentioned previously would impair this compensation significantly.) We refer to this capability as "self-magnetometry". The precision with which the orbits can be matched vertically depends on the precisions of the beam position monitors (BPMs) that measure the vertical beam positions, and on the ring lattice sensitivity to the magnetic field errors causing the orbits to be vertically imperfect. Because of the weak vertical focusing this sensitivity is excellent.

Assuming both beam spins are frozen, at least the "primary" beam-1 will, by convention, be globally frozen, with spin tune $Q_{s1}=0$. The presence of magnetic bending guarantees that this condition can be satisfied. Ideally both beams would have $Q_s=0$ but, with only a few exceptions, the "secondary" beam-2 can only be locally frozen; $Q_{s2}$ exactly equal to a rational fraction other than 0/1.

In this condition both beam polarizations can be phase-locked, allowing both beam spin tunes to be set and re-set with frequency domain precision. This means that synchronism can be maintained for runs of arbitrary duration. Since the RF frequency can also be restored to arbitrarily high precision, conditions can be set and re-set repeatedly, without depending upon high precision measurement of the electric and magnetic bend fields.

This also allows, for example, the magnetic bending field to be reversed with high precision, as would be required to interchange CW and CCW beams. This capability can be referred to as stabilizing all fields by phase locking both revolution frequencies and both beam polarizations, using their own MDMs as "magnetometric gyroscopes".

Figure 5:
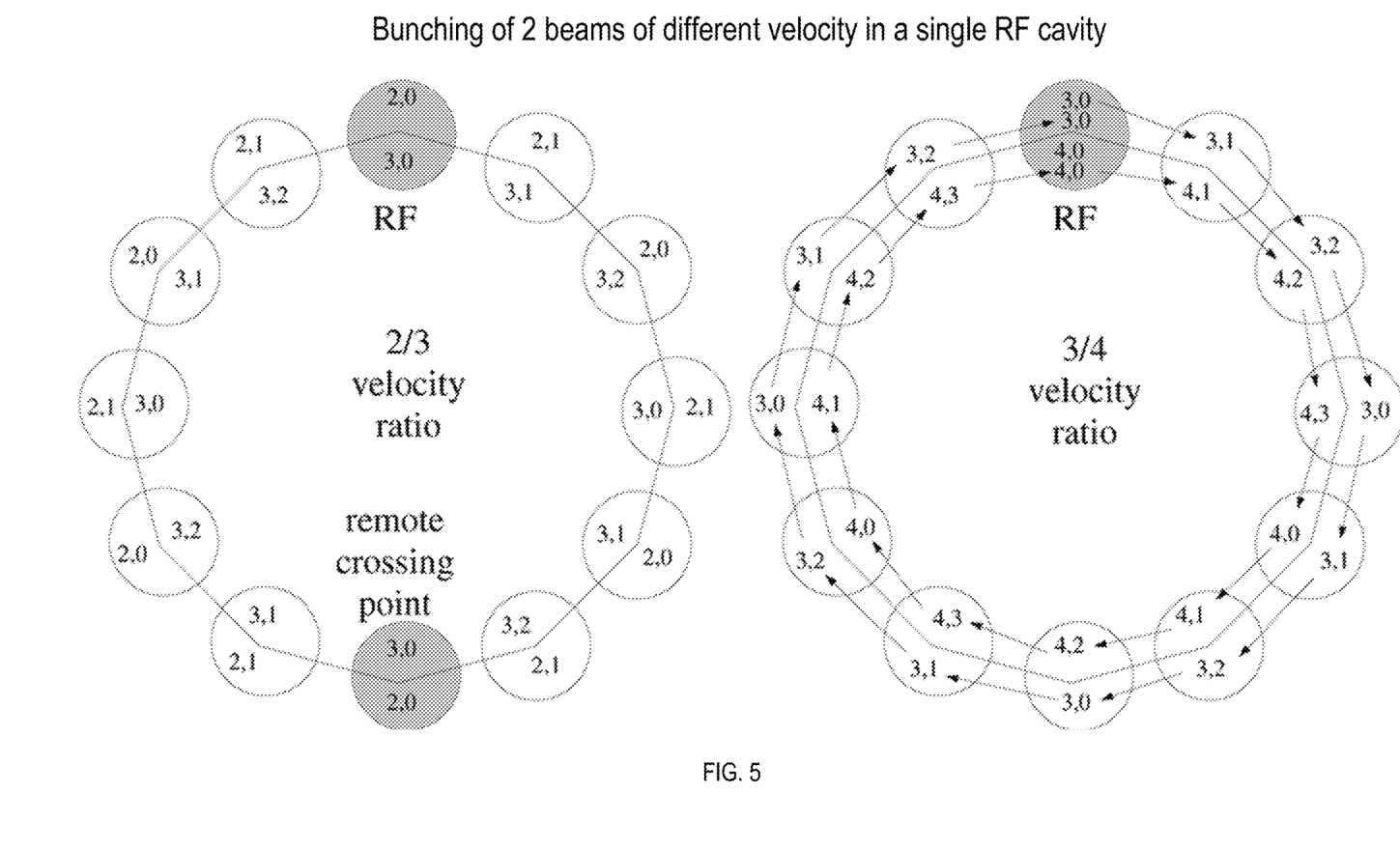
FIG. 5 is a schematic showing stable RF buckets for beam velocity ratios of 2/3 or 3/4

The condition for bunch collision points to occur at fixed ring locations is met by the beam velocities being in the ratio of integers; e.g. $\beta_1/\beta_2=8/7$ in FIG. 5. Both circulating beams can be bunched by a single RF cavity in spite of their different velocities.

With 8/7 velocity ratio and 7×8=56, the RF frequency can be the 56th harmonic of a standard base frequency, $f_{base}$, itself a harmonic number $h_n$ multiple $f_{base}=h_n f_{rev}$ of the revolution frequency. Stable buckets are labeled for simple cases in FIG. 5.

FIG. 5 is a schematic showing stable RF buckets for beam velocity ratios of 2/3 or 3/4. Shaded circles indicate locations at which bunch positions coincide, which are examples of intersection point 167p. In FIG. 5, when the second indices are both zero, the populated bunches superimpose. A "remote" bunch collision point appears on the left, but not on the right. The undesirable collisions at the RF location should be removable with symmetrically split RF locations; i.e. with no RF cavity at the "effective cavity location" labelled "RF" in the figure.

Nuclear Physics Investigation with E&M Storage Ring "Rear End" Collisions: h+d→α+p "Rear-end" collisions occurring during the passage of faster bunches through slower bunches can be used to study spin dependence of nucleon, nucleon collisions in a semi-relativistic moving coordinate frame. Such rear-end collisions allow the CM KEs to be in the several 300 KeV range, while all incident and scattered particles have convenient laboratory KEs, two orders of magnitude higher, in the tens of MeV range.

This permits incident beams to be established in pure spin states and the polarizations of scattered particles to be measured with high analyzing power and high efficiency. In this way embodiments of synchrotron 160 satisfy the condition that all nuclear collisions take place in a coordinate frame moving at convenient semi-relativistic speed in the laboratory, with CM KEs comparable with Coulomb barrier heights.

As a first nuclear physics example, embodiments described herein include a deuteron beam and a helion beam co-circulating concurrently in synchrotron 160, with parameters arranged such that, in the process d+h→p+α, rear-end collisions always occur in a detector at a same location along the synchrotron, herein referred to as an intersection point (IP), such as intersection point 167p, FIG. 1. In embodiments, the aforementioned parameters are those of equation (1), where they satisfy equation (2) for each of the deuteron beam and the helion beam. In a conventional (magnetic) contra-circulating colliding beam storage ring, the energy would be above the pion production threshold, with production into this transmutation channel negligibly small.

Consider d and h beams co-circulating concurrently in the same storage ring, with parameters arranged such that, in the process d+h→p+α, rear-end collisions always occur in the detector at an intersection point (IP). The center of mass kinetic energies (where their momenta are equal and opposite) may be adjusted to be close to the Coulomb barrier height for this nuclear scattering channel. When both equation (2) and frequency and phase-lock conditions described previously are satisfied, all nuclear events will occur at the ring intersection point (IP) of a full acceptance interaction detector/polarimeter.

Figure 6:
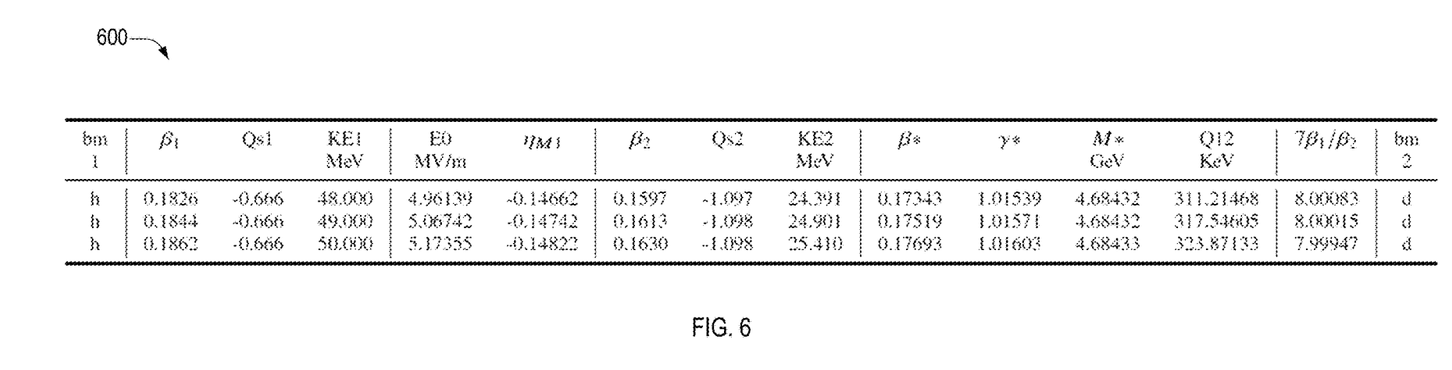
FIG. 6 includes a table of kinematic parameters for a nuclear scattering channel of an embodiment of a fusion-power generator of FIG. 1.

FIG. 6 includes a table 600 that provides kinematic parameters for the h+d→α+p nuclear scattering channel. Table 600 includes data of a fine-grain scan to center the collision point for co-traveling KE1=49 MeV helion energy and 24.9 MeV deuteron energy. The bend radius is $r_0=11$ m. In table 600, $\beta_1$ and $\beta_2$ denote $\beta_h$ and $\beta_d$, respectively.

When the ratio of velocities is exactly $\beta_1/\beta_2=8/7$, the bunch rear-end collisions will always occur at the same point in the ring, e.g., at reaction zone 167. The particular point where these collisions occur may then be adjusted to occur at the nuclear collision detector by synchronizing the phases of charged-particle beams 122b and 133b. With both frequencies fixed, the relative phase of the RF excitation may be adjusted so that the excitation phase vanishes at the instant the two bunch centroids coincide at the detector location.

The first and last columns identify incident beams h and d as beams 1 and 2. Columns 2, 3, 4 contain beam 1 parameters; column 5 gives the electric field, and column 6 gives the magnetic bending fraction $\beta_{M1}$ (not the same as for particle 2); columns 7, 8, and 9 contain beam 2 parameters; the remaining columns give CM quantities, which are identified by asterisks "*".

In table 600, the number 8.00015, the final entry in the middle row, is close enough to the integer 8 to permit phase-locking to exactly 8; this locks the bunch collisions occurring every 8th turn of the faster particle to a fixed (but adjustable) ring location. The columns of table 600 labeled $Q_s$ are spin tunes.

In this configuration the rest mass of the h, d system will be fine-tunable on a KeV scale, for example barely exceeding the threshold of the h+d→α+p channel, but below pion production and other inelastic thresholds. Neglecting spin dependence, the expected radiation pattern can be described as a "rainbow" circular ring (or rather cone) formed by the more massive (α-particles) emerging from, and centered on, the common beam axis. This "view" has not been observed previously in nuclear measurements since it requires a "rear end" collision. The h+d→α+p nuclear transmutation channel, are illustrated as "rainbows" in FIG. 8.

Figure 8:
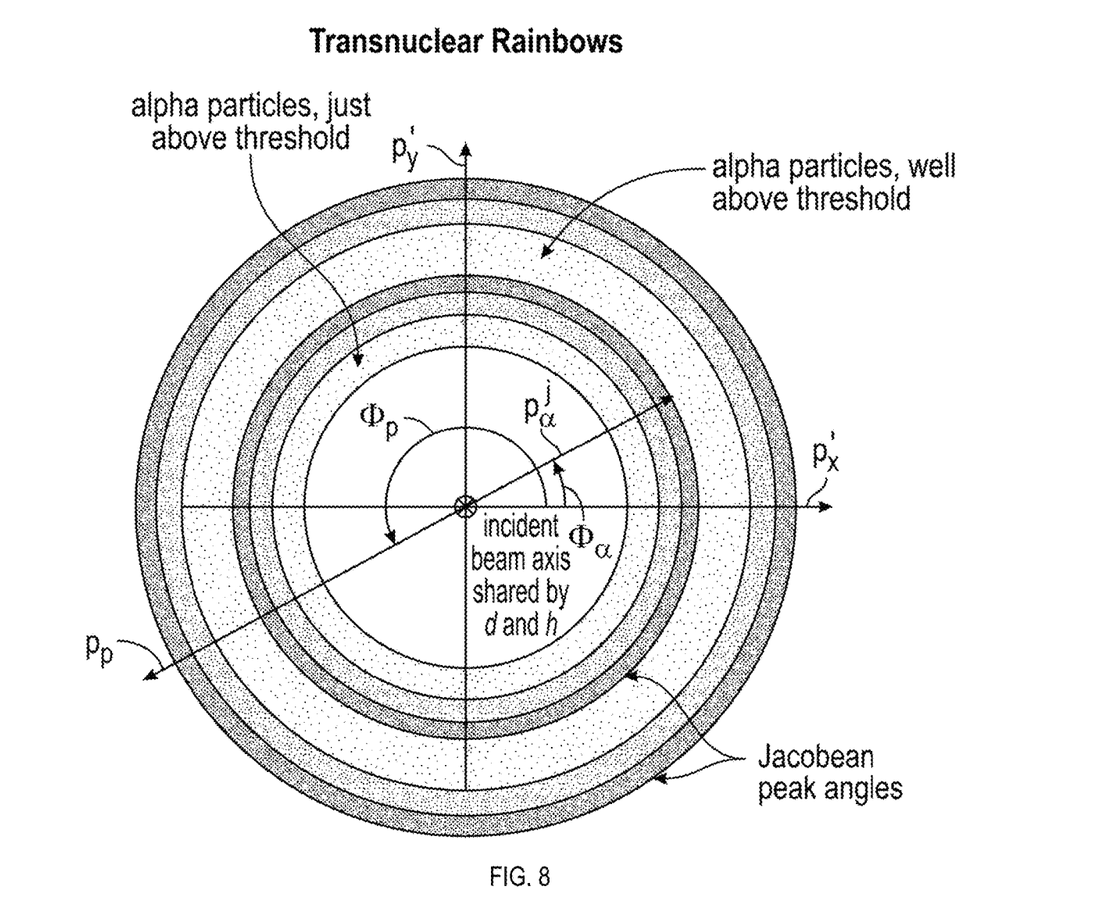
FIG. 8 shows transnuclear "rainbows" produced in the reaction h+d→α+p, which may occur in an embodiment of the fusion-power generator of FIG. 1.

FIG. 8 shows transnuclear "rainbows" produced in the reaction h+d→α+p. Shading represents scattered differential cross section. Rainbow radii increase proportional to incident energy excess above threshold. Superscript "J" labels the rainbow divergence edge caused by the vanishing Jacobean at the laboratory scattering angle maximum. Jacobean peak "rainbow" production patterns for the nuclear transmutation process h+d→α+p. The p+d→h+γ channel would exhibit only a single, more acute angle h rainbow. For correlation with, say, terrestrial rainbows, refer to Van-de-Hulst. For actual rainbows a further empirical numerical factor, π(m−1) of order 1, multiplying the diameter, is required, where m is "index of refraction".

The electric/magnetic field ratio of table 600 produces perfect $\beta_h/\beta_d=8/7$ velocity ratio so that, for every 7 deuteron turns, the helion makes 8 turns Notice, also, the approximate match of $Q_{12}=517$ KeV in table 600, with Coulomb barrier energy, $V_{d,He3}=513.1$ KeV. This matches the incident kinetic energy to the value required to surmount the repulsive Coulomb barrier.

Nuclear-Event Rate Calculation: h+d→α+p

The following nuclear-event rate calculation is for when the $7\beta_h/\beta_d=8$. Typical parameters include:
1. storage ring revolution frequency $f_{sr}=10^6$ Hz,
2. numbers of stored particles $N_d$, $N_h=10^{11}$,
3. beam area $A_b=0.1$ cm×0.1 cm=$10^{-2}$ cm$^2$, and
4. nuclear cross section $\sigma=10^{-24}$ cm$^2$.

In embodiments, the (deuterium) "target bunch nuclear opacity" is $$O_N = N_d\sigma/A_b = 10^{11} \times 10^{-24}/10^{-2} = 10^{-11},$$

which gives the fraction of particle passages that results in a nuclear event. The rate of particle passages is $$r_{pass} = \frac{f_{sr}}{7}N_h = \frac{10^6}{7} \times 10^{11} = 0.342 \times 1 \times 10^{17} s^{-1}.$$

The resulting nuclear event rate is $$r_{event} = O_N \times r_{pass} = 10^{-11} \times 0.342 \times 10^{17} = 1.42 \times 10^5 s^{-1}.$$

Figure 7:
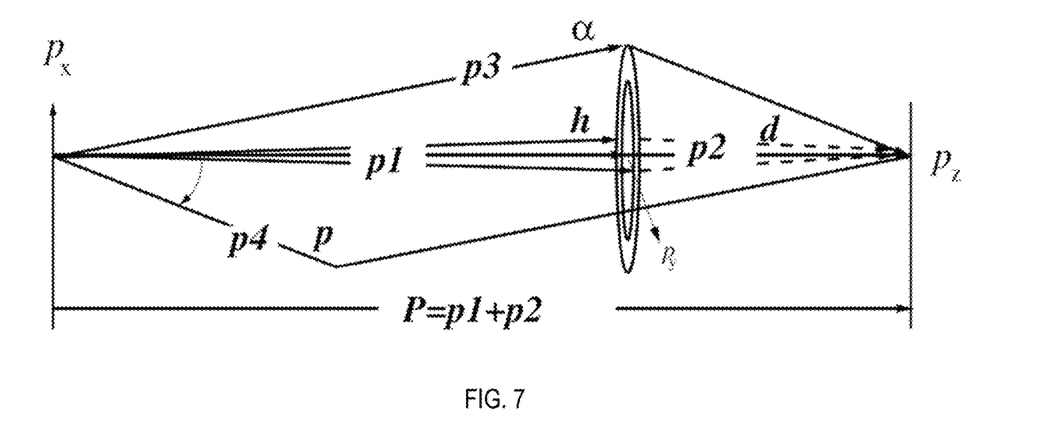
FIG. 7 is a laboratory frame momentum vector diagram for the nuclear transmutation process h+d→α+p, which may occur in an embodiment of the fusion-power generator of FIG. 1.

FIG. 7 is a laboratory frame momentum vector diagram for the process. The vector $P=p_1+p_2$ is the sum of the lab momenta of one particle from beam 1(*h*) and one from beam 2(*d*). Scattered alpha particle direction (3) is shown above the beam axis; the scattered proton direction (4) would then be below, as displayed by parallelogram construction.

Figure 9:
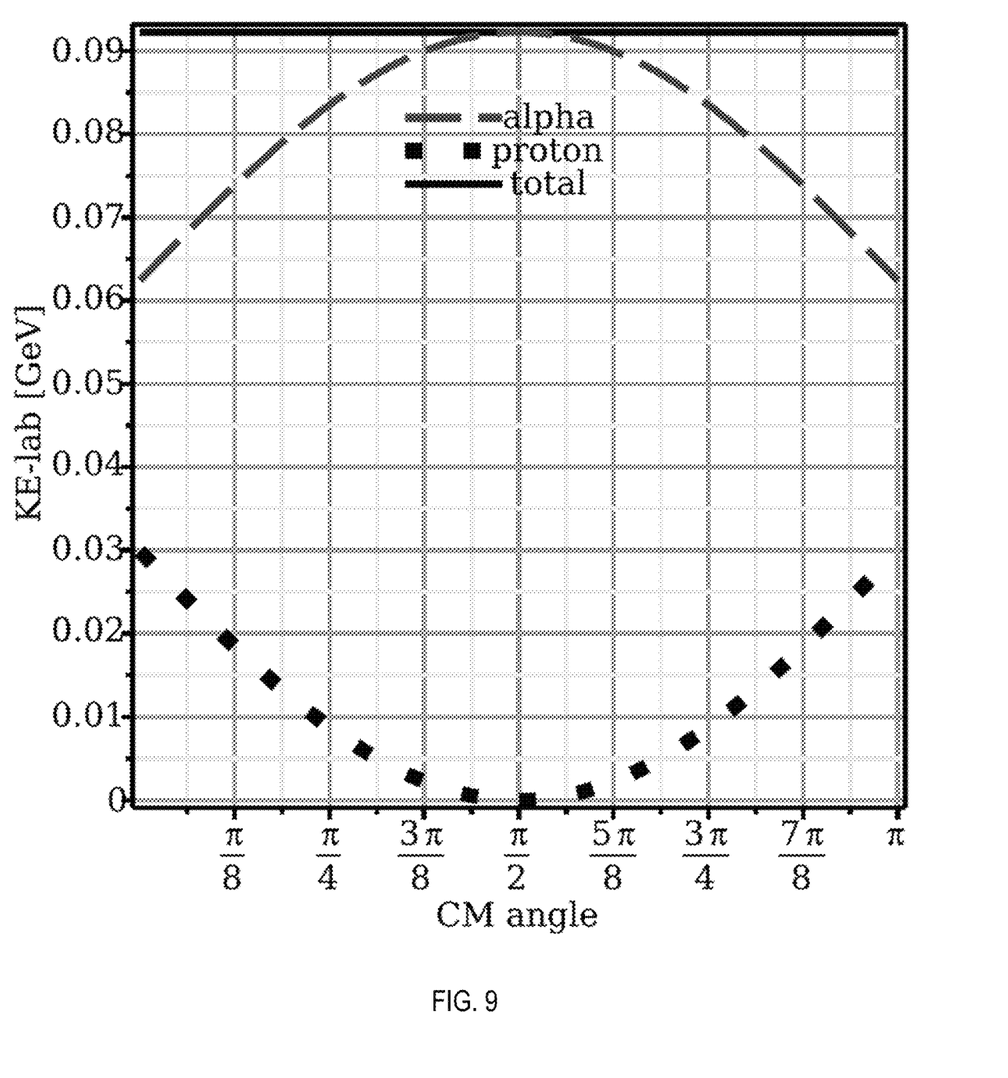
FIG. 9 is a plot of lab KEs vs center-of-mass angle for h+d→α+p process occurring in an embodiment of the fusion-power generator of FIG. 1.

Rolled around the longitudinal axis, the figure is intended to show how azimuthal symmetry imposes the rainbow scattering pattern shown in FIG. 9, with cone angle increasing proportional to the incident energy excess over threshold energy.

"Rainbow", "Rear-End" d+h→p+α Collisions

Here we consider d+h→p+α "elastic" (including weakly inelastic) scattering in synchrotron 160 of fusion-power generator 100. Deuteron (d) and helion (h) beams co-circulate concurrently with different velocities in synchrotron 160, such that "rear-end" collisions always occur at the same intersection point (IP), intersection point 167*p*. The CM kinetic energies may be varied continuously, keV by keV, from below the several hundred keV Coulomb barrier height, through the (previously inaccessible for spin control) range up to tens of MeV and beyond. With the scattering occurring in a moving frame, initial and final state laboratory momenta are in the convenient tens of MeV range.

All nuclear events occur within a full acceptance interaction detector/polarimeter. Temporarily neglecting spin dependence, the CM angular distributions will be approximately isotropic. In embodiments, when heavier particles being faster most final state particles end up traveling "forward" to produce "rainbow" circular rings (or rather cones) formed by the final state particles. FIG. 9 is a plot of lab KEs vs c.m. angle for the h+d→α+p process described above.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

I claim:

1. An ion collider comprising:
   a synchrotron including a plurality of beam-deflection units, each of the plurality of beam-deflection units including a magnetic deflection unit and an electrostatic deflection unit that produce, respectively, a magnetic field parallel to an axis of a storage ring of the synchrotron and an electric field toward the axis of the storage ring;
   a first injection accelerator, coupled to the synchrotron, that injects a plurality of deuterons into the synchrotron; and
   a second injection accelerator, coupled to the synchrotron, that injects a plurality of helions into the synchrotron;
   wherein the ion collider is configured to:
   (i) co-circulate on a same orbit of the synchrotron, the injected plurality of deuterons as a deuteron beam having a velocity $v_d$ and the injected plurality of helions as a helion beam having a velocity $v_h$;
   (ii) at completion of every seventh turn of the deuteron beam in the synchrotron, traverse the deuteron beam with the helion beam during an eighth turn of the helion beam, such that $v_h=(8/7)v_d$; and
   (iii) apply, via the plurality of beam-deflection units, a radial electric field and a transverse magnetic field to each of the deuteron beam and the helion beam, such that each of quantities $q_1r_0e(E_0/v_1+B_0)/p_1$ and $q_2r_0e(E_0/v_2+B_0)/p_2$ equals one, where (i) $q_1$, $v_1$, and $p_1$ are the charge, velocity, and momentum of each charged particle of the deuteron beam, respectively, (ii) $q_2$, $v_2$, and $p_2$ are the charge, velocity, and momentum of each charged particle of the second changed-particle beam respectively, and (iii) $E_0$ and $B_0$ are the respective magnitudes of the applied electric field and magnetic field.

2. The ion collider of claim 1, wherein each of the first injection accelerator and the second injection accelerator is a cyclotron.

3. The ion collider of claim 1, further comprising an energy recovery unit that receives alpha particles from one of the plurality of beam-deflection units.

4. The ion collider of claim 1, wherein the first injection accelerator injects the plurality of deuterons into the synchrotron and the second injection accelerator injects the plurality of helions into the synchrotron such that the plurality of deuterons and the plurality of helions propagate in a same direction in the storage ring.

5. The ion collider of claim 1, further comprising a radiation absorber thermally coupled to the storage ring.

6. The ion collider of claim 5, further comprising an energy recovery device thermally coupled to the radiation absorber.

7. The ion collider of claim 1, wherein the ion collider is configured to co-circulate the deuteron beam and the helion beam in a same direction in the synchrotron.

8. The ion collider of claim 1, wherein the ion collider is configured to maintain respective velocities of the helion beam to the deuteron beam at a ratio of 8/7.

9. The ion collider of claim 1, wherein the ion collider comprises an energy recovery unit that captures electrical energy from alpha particles from one of the plurality of beam-deflection units.

10. The ion collider of claim 9, wherein the energy recovery unit comprises an energy-recovery linear accelerator.

11. The ion collider of claim 10, wherein the ion collider is configured to repeatedly traverse the deuteron beam with the helion beam at a reaction zone with the storage ring.

* * * * *